US007825912B2

(12) United States Patent
Lee

(10) Patent No.: US 7,825,912 B2
(45) Date of Patent: Nov. 2, 2010

(54) TOUCH SCREEN FOR MOBILE TERMINAL AND POWER SAVING METHOD THEREOF

(75) Inventor: Chun Soo Lee, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 944 days.

(21) Appl. No.: 11/701,967

(22) Filed: Feb. 2, 2007

(65) Prior Publication Data

US 2008/0062150 A1 Mar. 13, 2008

(30) Foreign Application Priority Data

Sep. 12, 2006 (KR) ...................... 10-2006-0087894

(51) Int. Cl.
*G06F 3/042* (2006.01)
(52) U.S. Cl. ..................... 345/175; 345/173
(58) Field of Classification Search ................ 345/175
See application file for complete search history.

(56) References Cited

U.S. PATENT DOCUMENTS 5,162,783 A * 11/1992 Moreno ...................... 345/175
6,208,330 B1 * 3/2001 Hasegawa et al. ........... 345/173
2002/0180691 A1 * 12/2002 Wong et al. .................. 345/156
2005/0200606 A1 * 9/2005 Willemin et al. ............ 345/166

* cited by examiner

*Primary Examiner*—Richard Hjerpe
*Assistant Examiner*—Andrew Schnirel
(74) *Attorney, Agent, or Firm*—The Farrell Law Firm, LLP

(57) ABSTRACT

A touch screen of a mobile terminal and a power saving method thereof are provided. The power saving method of a touch screen for a mobile terminal includes determining whether a touch panel is contacted by controlling light emitting elements to emit light with a first scan speed and detecting whether light is received by light receiving elements; and decreasing, if the touch panel is determined not to be contacted for a predetermined time duration, a scan speed from the first scan speed to a second scan speed after lapse of the predetermined time duration. Therefore, if a contact occurs within the predetermined time duration, the contact is detected by executing the scan with the first scan speed, and if no contact is detected before lapse of the predetermined time duration, the scan speed is decreased, whereby electric current waste due to the scan can be minimized.

14 Claims, 7 Drawing Sheets

TOUCH SCREEN FOR MOBILE TERMINAL AND POWER SAVING METHOD THEREOF

PRIORITY

This application claims priority to an application entitled "TOUCH SCREEN FOR MOBILE TERMINAL AND POWER SAVING METHOD THEREOF" filed in the Korean Intellectual Property Office on Sep. 12, 2006 and assigned Ser. No. 2006-87894, the contents of which are incorporated herein by reference.

BACKGROUND OF THE INVENTION

1. Field of the Invention

The present invention relates to a touch screen for a mobile terminal and a power saving method thereof, and in particular, to a touch screen for a mobile terminal and a power saving method thereof that can reduce electric current consumed upon scanning.

2. Description of the Related Art

Nowadays, due to the rapid development of communications technology, voice communication can be performed using a mobile terminal at most times and places. As various functions are added to the mobile terminal, a user can utilize character information, image information, MP3, or games through a screen of a display unit in the mobile terminal. The display unit of the mobile terminal is typically a touch screen enabling input through repeated touching.

Moreover, the touch screen is a display device for executing an instruction by identifying a contact position of a person's finger or material on a visible character on or a specific position on a touch panel without using a key input unit, and process using stored software.

Particularly, the touch screen periodically executes a scan in order to detect whether a material is in contact. For example, a touch screen having 17 light emitting elements and 17 light receiving elements within a touch panel performs a scan that emits and receives light at a frequency of 100 times/second. In the following description, the number of executions of emitting and receiving light per second is referred to as a scan speed.

However, in a conventional touch screen, because a scan is continuously executed with a predetermined scan speed even if no material is in contact, there is a problem that electric current is wasted.

SUMMARY OF THE INVENTION

The present invention has been made in an effort to solve the above problems, and an object of the present invention is to provide a touch screen for a mobile terminal and a power saving method thereof that can minimize electric current waste due to the scan by adjusting a scan speed according to whether the touch screen is contacted.

In accordance with an aspect of the present invention, a power saving method of a touch screen for a mobile terminal includes determining whether a touch panel is contacted by controlling light emitting elements to emit light with a first scan speed and detecting whether light is received by light receiving elements; and decreasing, if a touch panel is determined not to have been contacted for a predetermined time duration, a scan speed from the first scan speed to a second scan speed after lapse of the predetermined time duration.

The scan speed may be immediately decreased from the first scan speed to the second scan speed upon lapse of the predetermined time duration.

Alternatively, the scan speed may be gradually decreased from the first scan speed to the second scan speed after lapse of the predetermined time duration.

Conversely, if the touch panel is further determined not to be contacted after the scan speed attains the second scan speed, the scan speed may be sustained at the second scan speed.

If the touch panel is determined to be contacted, the scan speed may immediately be recovered to the first scan speed.

Preferably, when the quantity of the light receiving elements is 17, the quantity of the light emitting elements is 17, and the first scan speed is 100 times/second, the second scan speed is 10 times/second.

In accordance with another aspect of the present invention, a power saving method of a touch screen for a mobile terminal, includes: determining whether a touch panel is contacted by controlling light emitting elements to emit light with a first scan speed and detecting whether light is received by light receiving elements; gradually decreasing, if a touch panel is determined not to be contacted for a first predetermined time duration, a scan speed after lapse of the first predetermined time duration; determining, after lapse of the first predetermined time duration, whether the touch panel is contacted before lapse of a second predetermined time duration; and sustaining, if the touch panel is determined not to be contacted before lapse of the second predetermined time duration, a scan speed at a second scan speed after lapse of the second predetermined time duration.

The power saving method may further include recovering, if the touch panel is determined to be contacted, the scan speed immediately to the first scan speed.

In accordance with another aspect of the present invention, a touch screen for a mobile terminal includes: a base substrate; a touch panel mounted on a surface of the base substrate; a plurality of light emitting elements arranged on the base substrate around a peripheral edge of the touch panel to radiate light towards the touch panel; a plurality of light receiving elements arranged on the base substrate around the peripheral edge of the touch panel and arranged to be opposite to the light emitting elements to receive light radiated from the light emitting elements; and a controller that determines whether the touch panel is contacted by controlling the light emitting elements to emit light with a first scan speed and detecting whether light is received by the light receiving elements, and decreases, if the touch panel is determined not to be contacted for a predetermined time duration, a scan speed from the first scan speed to a second scan speed after lapse of a predetermined time duration.

BRIEF DESCRIPTION OF THE DRAWINGS

The above and other objects, features and advantages of the present invention will be more apparent from the following detailed description in conjunction with the accompanying drawings, in which.

DETAILED DESCRIPTION OF PREFERRED EMBODIMENTS

Preferred embodiments of the present invention are described in detail with reference to the accompanying drawings. The same reference numbers are used throughout the drawings to refer to the same or like parts. Detailed descriptions of well-known functions and structures incorporated herein may be omitted to avoid obscuring the subject matter of the present invention.

While the present invention may be embodied in many different forms, specific embodiments of the present invention are shown in drawings and are described herein in detail, with the understanding that the present disclosure is to be considered as an exemplification of the principles of the invention and is not intended to limit the invention to the specific embodiments illustrated.

In the following description, a conventional scan speed is a first scan speed and a scan speed in a power saving mode according to the present invention is a second scan speed. The second scan speed is slower than the first scan speed and is a speed within a range that can recognize a physical contact.

Figure 1:
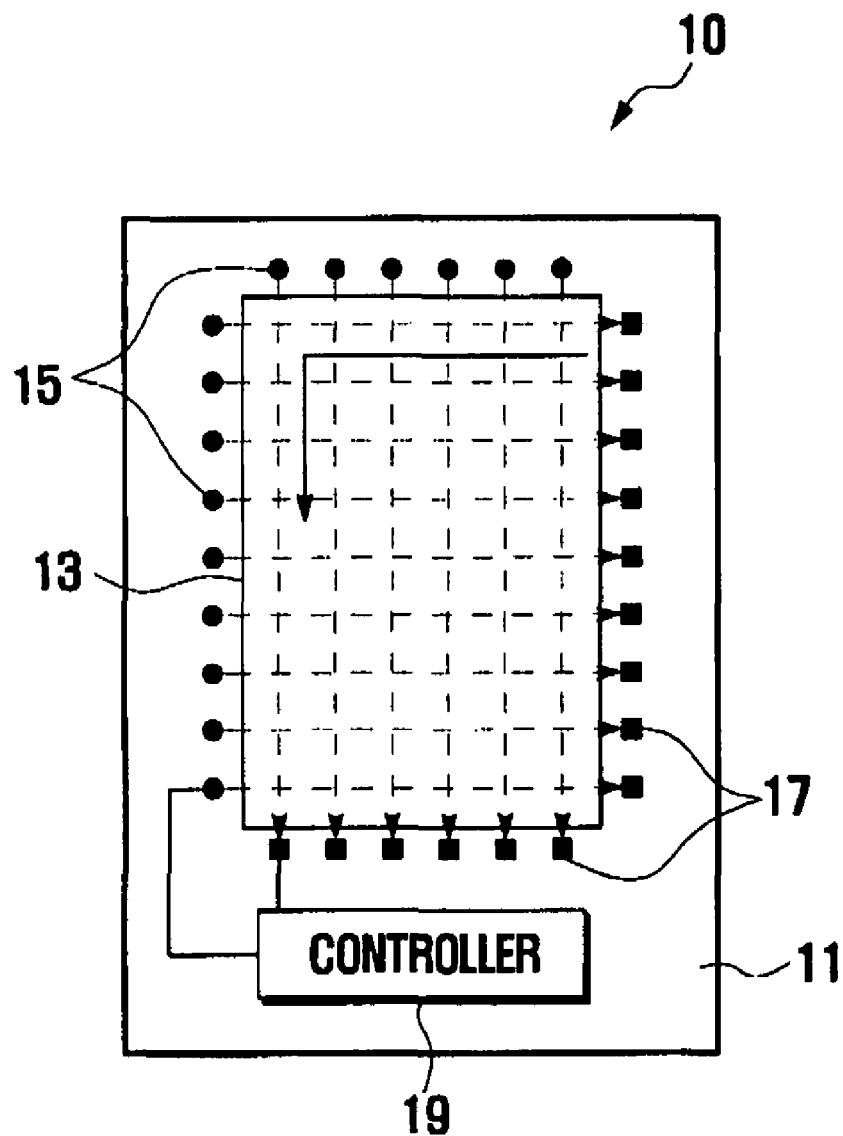
FIG. 1 is a diagram illustrating a circuit configuration of a touch screen for a mobile terminal according to the present invention.

FIG. 1 is a diagram illustrating a configuration of a touch screen 10 for a mobile terminal according to an exemplary embodiment of the present invention.

Referring to FIG. 1, the touch screen 10 is a touch screen that uses infrared rays and includes a base substrate 11, touch panel 13 mounted in the base substrate 11, light emitting elements 15, light receiving elements 17, and controller 19.

The base substrate 11 is a wiring substrate in which a circuit wiring is formed and uses a tape wiring substrate or a printed circuit board (PCB).

The touch panel 13 is mounted on a surface of the base substrate 11 and may have a rectangular shape, although numerous other shapes are permitted.

The light emitting elements 15 and the light receiving elements 17 of the same quantity are arranged at a peripheral edge of the touch panel 13. In the present embodiment, the light emitting elements 15 are arranged at an upper part and left part of the touch panel 13 and are spaced apart at predetermined intervals. The light receiving elements 17 are arranged at a lower part and right part of the touch panel 13 at a predetermined interval so as to be opposite to the light emitting elements 15. As the light emitting element 15, an infrared ray light emitting diode (Ir LED) is preferably used and as the light receiving element 17, a photo diode preferably is used. Accordingly, light radiated from the light emitting element 15 to the touch panel 13 is received by the light receiving element 17 arranged in a position opposite to the light emitting element 15.

The controller 19 controls operations of the components of the touch screen 10. specifically, controller 19 controls an operation related to scan mode and power saving mode setting and execution. The controller 19 also controls the light emitting elements 15 to emit light with a first scan speed and detects whether light is received by the light receiving elements 17, and determines whether the touch panel 13 is contacted. In the present embodiment, a scan direction is counterclockwise. For example, the scan is performed by emitting light from the light emitting elements 15 in a counterclockwise sequence, beginning from the light emitting element 15 positioned at the top right corner of the upper part of the touch panel 13, and sequentially receiving light by the corresponding light receiving element 17 opposite to the light emitting element 15. However, the scan may alternatively be performed clockwise.

Particularly, the controller 19 executes a power saving mode that decreases the scan speed from a first scan speed to a second scan speed if the touch panel 13 is not contacted for a predetermined time duration. If the controller 19 determines that the touch panel 13 is contacted again after lapse of the predetermined time duration, the controller 19 confirms that the touch panel 13 is contacted by immediately recovering the scan speed from the second scan speed to the first scan speed.

In operation, the controller 19 can execute either a first power saving mode or a second power saving mode according to a user's setting. In the first power saving mode, the controller 19 immediately decreases the scan speed from the first scan speed to the second scan speed after lapse of the predetermined time duration. In the second power saving mode, the controller 19 gradually decreases the scan speed from the first scan speed to the second scan speed during a second predetermined time duration that begins upon lapse of a first predetermined time duration. Conversely, if the touch panel 13 is determined not to be contacted after lapse of the second predetermined time duration, the scan speed is sustained at the second scan speed.

Therefore, the touch screen 10 according to an exemplary embodiment of the present invention can minimize electric current wastage due to the scan by decreasing a scan speed when contact is not detected.

Figure 2:
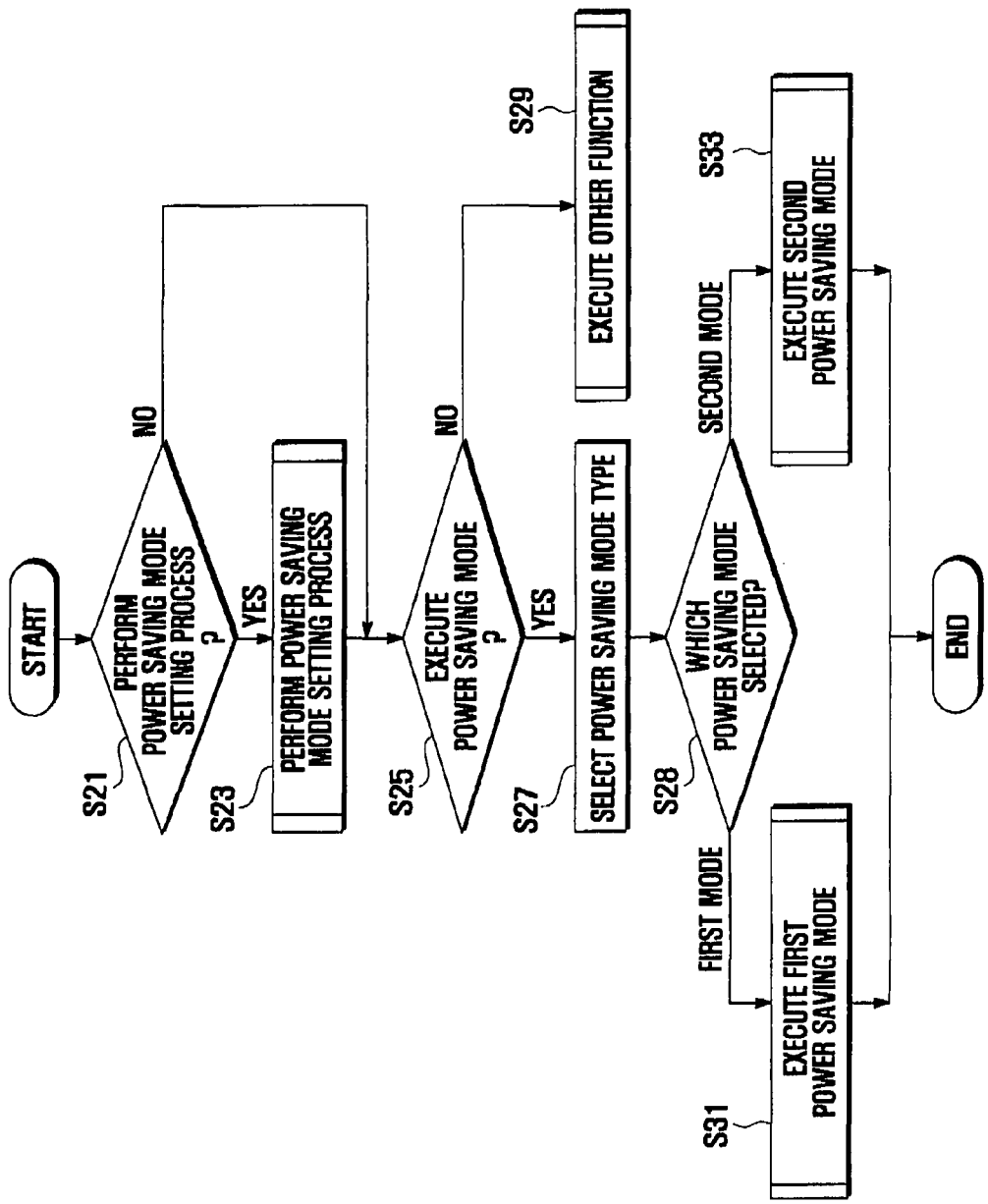
FIG. 2 is a flowchart illustrating a power saving method of a touch screen according to the present invention.

FIG. 2 is a flowchart illustrating a power saving method of a touch screen according to an the present invention.

As shown in FIGS. 1 and 2, the controller 19 of the touch screen 10 determines whether a user input through the touch panel 13 is to perform a power saving mode setting process in step S21. If an input through the touch panel 13 is to perform a power saving mode setting process, the power saving mode setting process is executed in step S23. If an input through the touch panel 13 is not to perform a power saving mode setting process, the controller 19 determines whether the user input is to execute the power saving mode in step S25. If the input is to execute the power saving mode, a process of selecting a type of the power saving mode is performed in step S27. The controller 19 determines the selected type of the power saving mode in step S28, and the first power saving mode is executed in step S31 or the second power saving mode in step S33 is executed according to the user's selection.

If the user input is not to execute the power saving mode at step S25, the controller 19 executes another function in step S29.

In the power saving method according to the present invention, the power saving mode setting process in step S23 is described in detail with reference to FIGS. 1 to 3 as follows.

Figure 3:
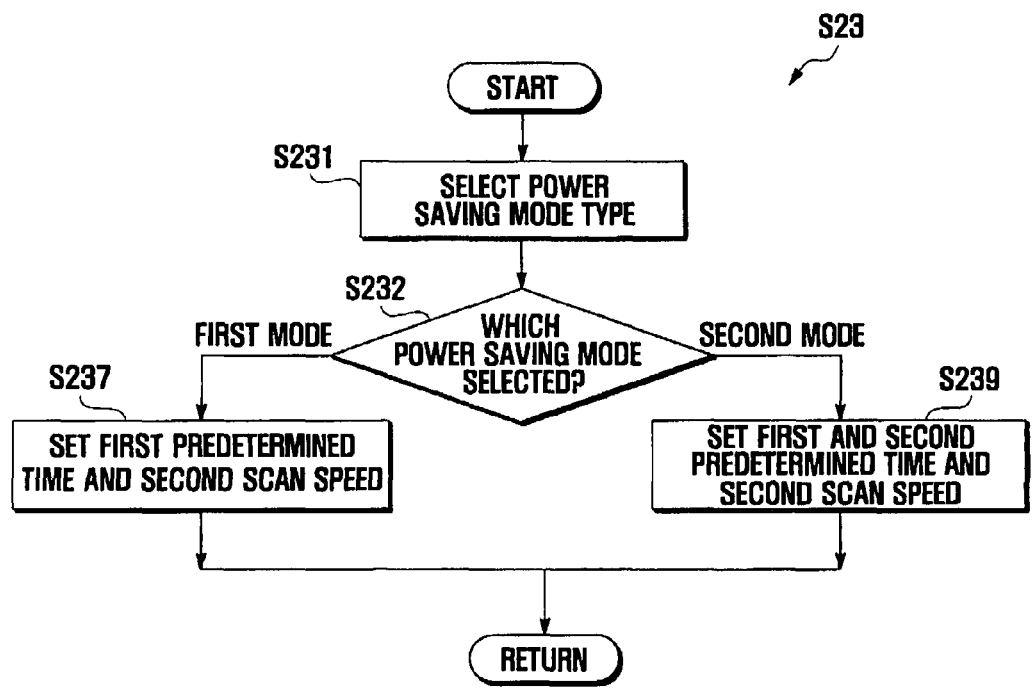
FIG. 3 is a flowchart illustrating a power saving mode-setting process in the method of FIG. 2.

FIG. 3 is a flowchart illustrating a power saving mode setting process in the method of FIG. 2.

The power saving mode setting process in step S23 begins with selecting a power saving mode type through user input using the touch panel 13 in step S231. The user can select the first power saving mode or the second power saving mode, and the controller 19 determines whether the first or the second power saving mode is selected in step S232.

If the first power saving mode is selected in step S232, the user sets a first predetermined time duration and a second scan speed through user input using the touch panel 13 in step S237. If the second power saving mode is selected in step S232, the user sets the first and second predetermined time duration and the second scan speed through input using the touch panel 13 in step S239. It is preferable that the second scan speed is set to a speed within a range that can recognize contact using the touch panel 13. For example, if the quantity of the light receiving elements 17 is 17, the quantity of the light emitting elements 15 is 17, and the first scan speed is 100 times/second, the second scan speed may be set to 10 times/second.

The first predetermined time duration is a time duration after a time point when a first contact through the touch panel 13 is detected. When a second contact is not detected before lapse of the first predetermined time duration, the scan speed is differently determined according to the selected power saving mode. In the second power saving mode, the user further sets a second predetermined time duration required to change from the first scan speed to the second scan speed. The reason why the first and second predetermined time durations are set is described in the following first and second power saving mode execution processes in steps S31 and S33 in FIG. 2.

In the power saving method according to the present invention, the first power saving mode execution process is described in detail with reference to FIGS. 1, 2, 4, and 5.

Figure 4:
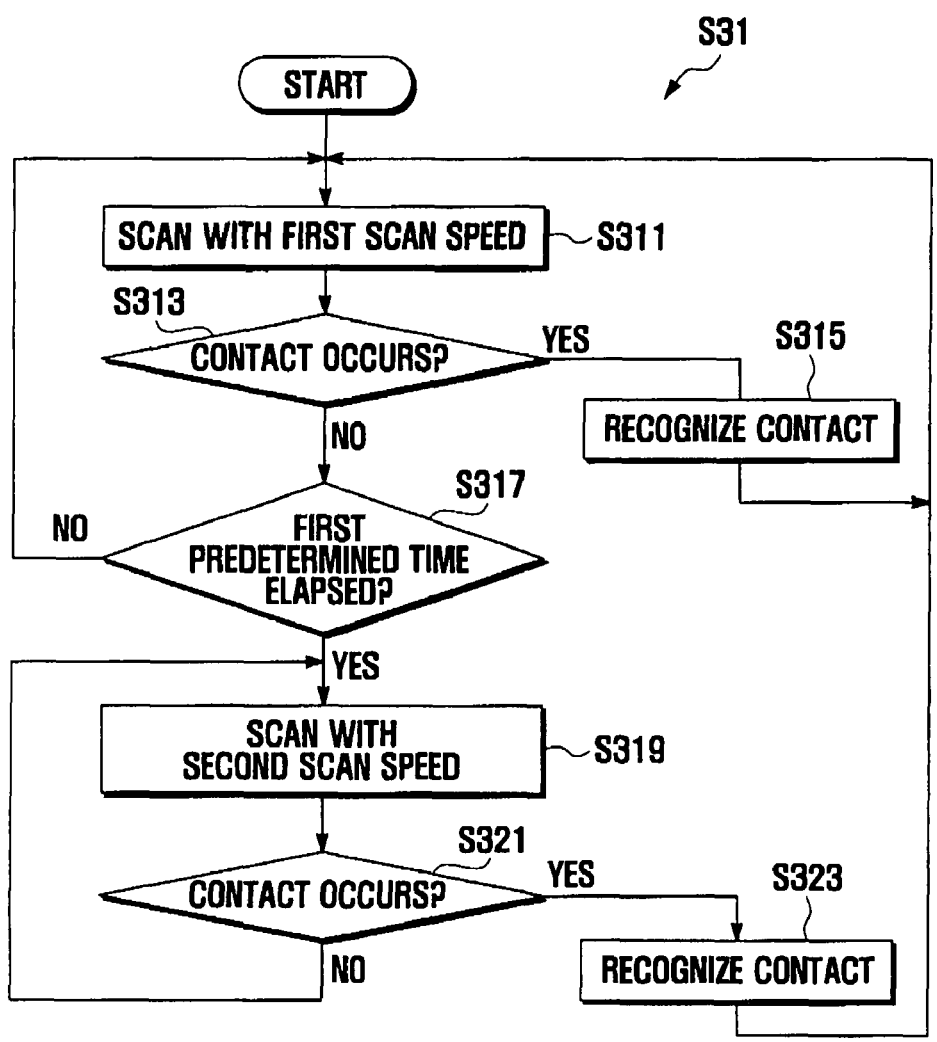
FIG. 4 is a flowchart illustrating a first power saving mode execution process in the method of FIG. 2.
Figure 5:
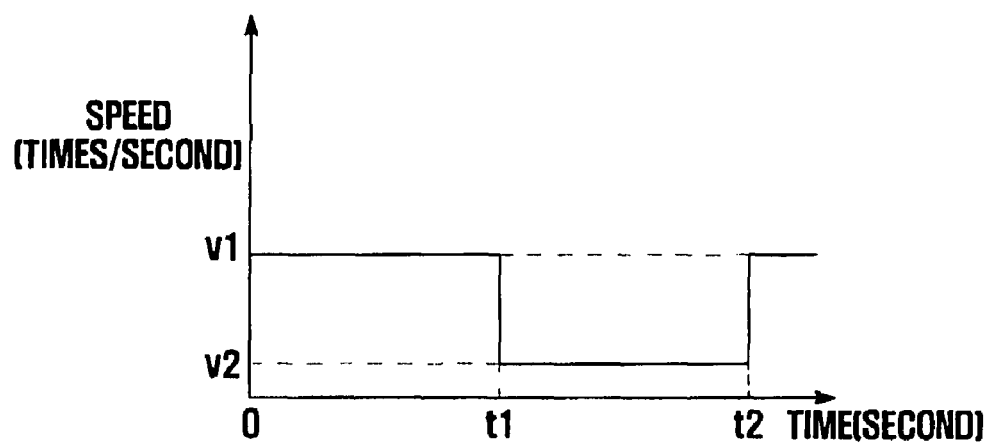
FIG. 5 is a graph showing the change of a scan speed by executing the first power saving mode in the process of FIG. 4.

FIG. 4 is a flowchart illustrating a first power saving mode execution process in step S31 in the method of FIG. 2. FIG. 5 is a graph showing the change of a scan speed by executing the first power saving mode in the process of FIG. 4. In FIG. 5, a time point when a contact to the touch panel 13 is detected occurs at 0 seconds.

The controller 19 scans with the first scan speed (v1) after a time point (0 seconds) when contact to the touch panel 13 is detected in step S311, and checks whether a further contact to the touch panel 13 occurs in step S313. That is, the controller 19 controls the light emitting elements 15 to emit light with the first scan speed (v1) and checks whether the touch panel 13 is contacted by detecting whether light is received by each of the light receiving elements 17.

If a further contact is detected, the controller 19 recognizes the contact in step S315 and the process returns to steps S311, so that the time point reverts to 0 seconds and the scan speed is sustained at the first scan speed (v1). Thus if the touch pad 13 is contacted, at least one light receiving element 17 that cannot receive light radiated from the light emitting element 15 is detected. This is detected by the controller 19 and recognized as a contact.

If a contact is not detected in step S313, the controller 19 checks whether the first predetermined time duration (t1) has elapsed in step S317. If the first predetermined time duration (t1) has not elapsed, the process returns to step S311 and the controller 19 continues to perform the scan with the first scan speed (v1). If the first predetermined time duration (t1) elapses without a contact being detected, the controller 19 decreases the scan speed from the first scan speed (v1) to the second scan speed (v2) immediately upon lapse of the first predetermined time duration (t1) in step S319.

The controller 19 checks whether a contact occurs while scanning with the second scan speed (v2) after lapse of the first predetermined time duration (t1) in step S321. If a contact is not detected, the process goes to step S319 and the controller 19 sustains the scan speed at the second scan speed (v2). However, if a contact is detected at any time point (t2) after lapse of the first predetermined time duration (t1), the controller 19 recognizes the contact (S323) and the process returns to step S311, so that the scan speed immediately recovers from the second scan speed (v2) to the first scan speed (v1).

In the power saving method according to an exemplary embodiment of the present invention, the second power saving mode execution process is described in detail with reference to FIGS. 1, 2, 6, and 7 as follows.

Figure 6:
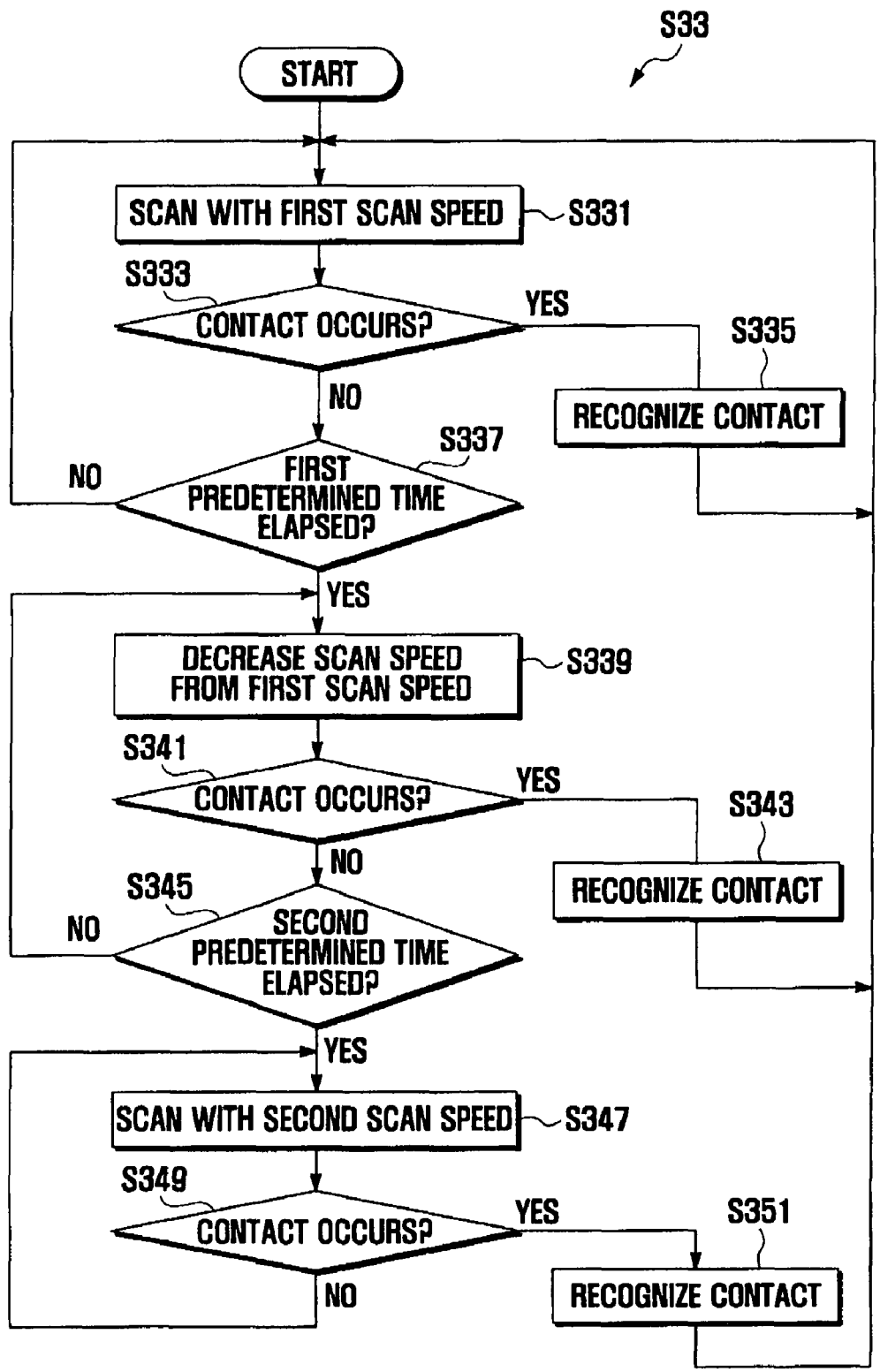
FIG. 6 is a flowchart illustrating a second power saving mode execution process in the method of FIG. 2.
Figure 7:
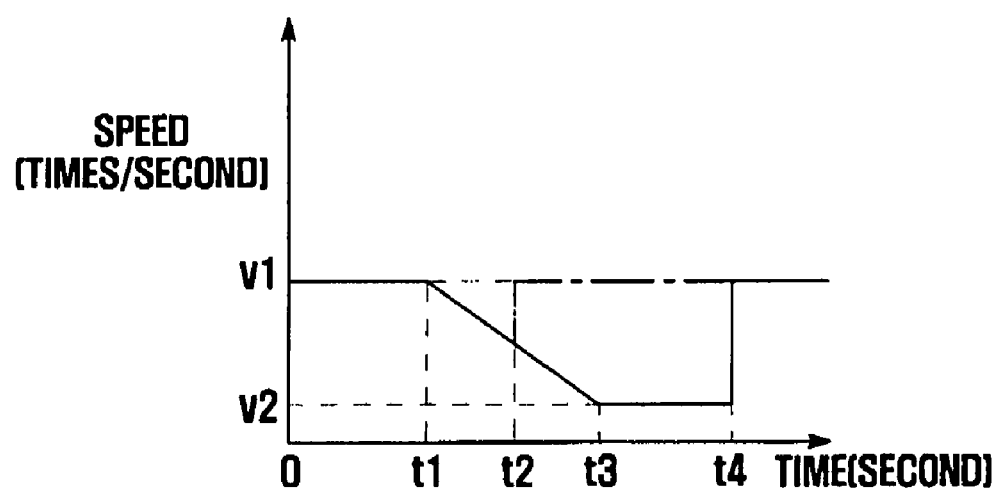
FIG. 7 is a graph showing the change of a scan speed by executing the second power saving mode in the process of FIG. 6.

FIG. 6 is a flowchart illustrating a second power saving mode execution process in step S33 in the method of FIG. 2. FIG. 7 is a graph showing the change of a scan speed by executing the second power saving mode of FIG. 6. FIG. 7, a time point when a contact to the touch panel 13 is detected occurs at 0 seconds.

In the second power saving mode execution process of FIG. 6, because process steps S331 through S337 describe a process of checking whether the first predetermined time duration (t1) has elapsed in steps S337 and are performed similarly to the equivalent steps S311 through S317 of the first power saving mode execution process of FIG. 4, only subsequent process steps are described.

If the first predetermined time duration (t1) elapses without a contact being detected, the controller 19 gradually decreases the scan speed from the first scan speed (v1) after lapse of the first predetermined time duration (t1) in step S339.

The controller 19 further checks whether a contact occurs after lapse of the first predetermined time duration (t1) in step S341. If a contact is detected at any time point (t2) after lapse of the first predetermined time duration (t1), the controller 19 recognizes the contact in step S343 and the process returns to step S331, so that the scan speed immediately recovers to the first scan speed (v1).

If a contact is not detected at step S341, the controller 19 checks whether the second predetermined time duration (t2) has elapsed at time point t3 in step S345. If the second predetermined time duration (t3) has not elapsed, the process returns to step S339 and the controller 19 continues to gradually decrease the scan speed from the first scan speed (v1).

If the second predetermined time duration (t3) elapses without a contact being detected, the controller 19 scans with the second scan speed (v2) after lapse of the second predetermined time duration (t3) in step S347. The second scan speed (v2) is a scan speed at the time point when the second predetermined time duration (t3) elapses.

The controller 19 checks whether a contact occurs while scanning with the second scan speed (v2) after lapse of the second predetermined time duration (t3) in step S349. If a contact is not detected, the process returns to step S347 and the controller 19 sustains the scan speed at the second scan speed (v2). However, if a contact is detected at any time point (t4) after lapse of the second predetermined time duration (t3), the controller 19 recognizes the contact in step S351 and the process returns to step S331, so that the scan speed immediately recovers to the first scan speed (v1).

In the present embodiment, a mobile terminal having a touch screen is exemplified, however the present invention can be applied to other electronic appliances having a touch screen. Further, a rectangular touch screen is exemplified, however the present invention can be applied to a touch screen of another shape. In the second power saving mode, an example in which the scan speed uniformly decreases from the first scan speed to the second scan speed is described, however the scan speed may be decreased in the form of a downward curve or another form. An example in which the scan speed immediately recovers to the first scan speed on detecting a contact is described, however the scan speed may be recovered the first scan speed after a predetermined time duration from detecting a contact.

According to the present invention, if a contact occurs within a predetermined time duration, the contact is detected by performing a scan with a first scan speed as in the related art and, if no contact is detected during the predetermined time duration, the scan speed is decreased from the first scan speed, whereby electric current waste due to the scan can be minimized.

Although exemplary embodiments of the present invention have been described in detail hereinabove, it should be clearly understood that many variations and modifications of the basic inventive concepts herein taught which may appear to those skilled in the present art will still fall within the spirit and scope of the present invention, as defined in the appended claims.

What is claimed is:

1. A touch screen for a mobile terminal comprising:
   a base substrate;
   a touch panel mounted on a surface of the base substrate;
   a plurality of light emitting elements arranged on the base substrate around a peripheral edge of the touch panel to radiate light towards the touch panel;
   a plurality of light receiving elements arranged on the base substrate around the peripheral edge of the touch panel and arranged to be opposite to the light emitting elements to receive light radiated from the light emitting elements; and
   a controller that determines whether the touch panel is contacted by controlling the light emitting elements to emit light with a first scan speed and detecting whether light is received by the light receiving elements, and decreases, if the touch panel is determined not to be contacted for a predetermined time duration, a scan speed from the first scan speed to a second scan speed after lapse of the predetermined time duration.

2. The touch screen of claim 1, wherein the controller immediately decreases the scan speed from the first scan speed to the second scan speed upon lapse of the predetermined time duration.

3. The touch screen of claim 1, wherein the controller gradually decreases the scan speed from the first scan speed to the second scan speed after lapse of the predetermined time duration.

4. The touch screen of claim 3, wherein if the touch panel is further determined not to be contacted after the scan speed attains the second scan speed, the controller sustains the scan speed at the second scan speed.

5. The touch screen of claim 1, wherein if the touch panel determine to be contacted, the scan speed is immediately recovered to the first scan speed.

6. The touch screen of claim 1, wherein when the quantity of the light receiving elements is 17, the quantity of the light emitting elements is 17, and the first scan speed is 100 times/second, the second scan speed is 10 times/second.

7. A power saving method of a touch screen for a mobile terminal, comprising:
   determining whether a touch panel is contacted by controlling light emitting elements to emit light with a first scan speed and detecting whether light is received by light receiving elements; and
   decreasing, if a touch panel is determined not to be contacted for a predetermined time duration, a scan speed from the first scan speed to a second scan speed after lapse of the predetermined time duration.

8. The power saving method of claim 7, wherein in decreasing a scan speed, the scan speed is immediately decreased from the first scan speed to the second scan speed upon lapse of the predetermined time duration.

9. The power saving method of claim 7, wherein in the step of decreasing a scan speed, the scan speed is gradually decreased from the first scan speed to the second scan speed after lapse of the predetermined time duration.

10. The power saving method of claim 9, wherein if the touch panel is further determined not to be detected after the scan speed attains the second scan speed, the scan speed is sustained at the second scan speed.

11. The power saving method of claim 7, further comprising recovering, if the touch panel is determined to be contacted, the scan speed immediately to the first scan speed.

12. The power saving method of claim 7, wherein when the quantity of the light receiving elements is 17, the quantity of the light emitting elements is 17, and the first scan speed is 100 times/second, the second scan speed is 10 times/second.

13. A power saving method of a touch screen for a mobile terminal, comprising:
   determining whether a touch panel is contacted by controlling light emitting elements to emit light with a first scan speed and detecting whether light is received by light receiving elements;
   gradually decreasing, if a touch panel is determined not to be contacted for a first predetermined time duration, a scan speed after lapse of the first predetermined time duration;
   determining, after lapse of the first predetermined time duration, whether the touch panel is contacted before lapse a second predetermined time duration; and
   sustaining, if the touch panel is determined not to be contacted before lapse of the second predetermined time duration, the scan speed at a second scan speed after lapse of the second predetermined time duration.

14. The power saving method of claim 13, further comprising recovering, if the touch panel is determined to be contacted, the scan speed immediately to the first scan speed.

* * * * *